US010619690B2

(12) United States Patent
Remond et al.

(10) Patent No.: US 10,619,690 B2
(45) Date of Patent: Apr. 14, 2020

(54) HEAT SCREEN WITH OBSTACLES FOR A BRAKED AIRCRAFT WHEEL

(71) Applicant: SAFRAN LANDING SYSTEMS, Velizy Villacoublay (FR)

(72) Inventors: Sébastien Remond, Velizy-Villacoublay (FR); Jeoffrey Choplin, Velizy-Villacoublay (FR)

(73) Assignee: SAFRAN LANDING SYSTEMS, Velizy, Villacoublay (FR)

( * ) Notice: Subject to any disclaimer, the term of this patent is extended or adjusted under 35 U.S.C. 154(b) by 0 days.

(21) Appl. No.: 15/659,041

(22) Filed: Jul. 25, 2017

(65) Prior Publication Data

US 2018/0031062 A1    Feb. 1, 2018

(30) Foreign Application Priority Data

Jul. 27, 2016   (FR) .................................... 16 57207

(51) Int. Cl.
    *F16D 65/847*     (2006.01)
    *B60T 5/00*     (2006.01)
    *B64C 25/42*     (2006.01)
    *F16D 65/78*     (2006.01)

(52) U.S. Cl.
    CPC .............. *F16D 65/847* (2013.01); *B60T 5/00* (2013.01); *B64C 25/42* (2013.01); *F16D 2065/785* (2013.01)

(58) Field of Classification Search
    CPC . F16D 65/847; F16D 2065/785; B64C 25/42; B60T 5/00

USPC .......... 188/264 A, 264 R, 264 G; 244/110 R, 244/110 A, 110 H, 10

See application file for complete search history.

(56) References Cited

U.S. PATENT DOCUMENTS

| | | | |
|---|---|---|---|
| 2003/0102710 A1* | 6/2003 | Thorp et al. | |
| 2005/0224634 A1* | 10/2005 | Rea | |
| 2010/0025172 A1* | 2/2010 | Campbell | |
| 2012/0241557 A1* | 9/2012 | Coty | |

FOREIGN PATENT DOCUMENTS

| | | |
|---|---|---|
| DE | 9405158 U1 | 5/1994 |
| EP | 0555822 A1 | 8/1993 |
| EP | 2503176 A1 | 9/2012 |
| FR | 2990188 A1 | 11/2013 |
| JP | 2011-220372 A | 11/2011 |
| WO | 2016/177844 A1 | 11/2016 |

OTHER PUBLICATIONS

French Search Report of FR1657207, dated Mar. 17, 2017.

* cited by examiner

*Primary Examiner* — Pamela Rodriguez
(74) *Attorney, Agent, or Firm* — Sughrue Mion, PLLC

(57) ABSTRACT

A method of reducing the cooling time of disks of a brake (5) of an aircraft wheel (1) fitted with a heat screen (10) extending between the wheel and the disks of the brake and mounted to rotate on an aircraft undercarriage about an axis of rotation, the method including making obstacles (11) on the heat screen, which obstacles project from a face of the heat screen that faces towards the brake disks.

15 Claims, 2 Drawing Sheets

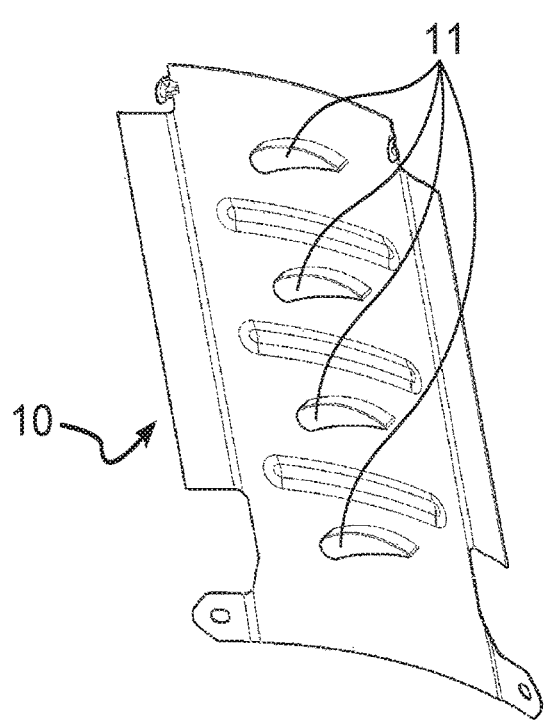
Fig. 2.a
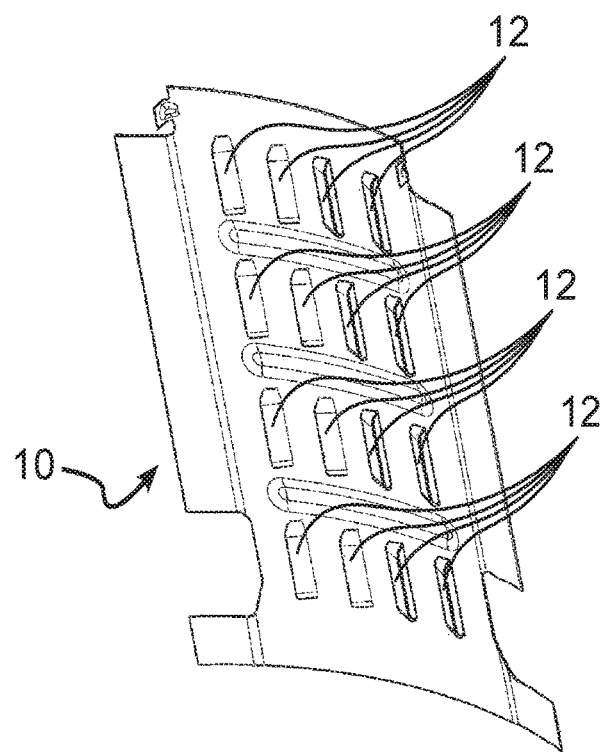
Fig. 2.b
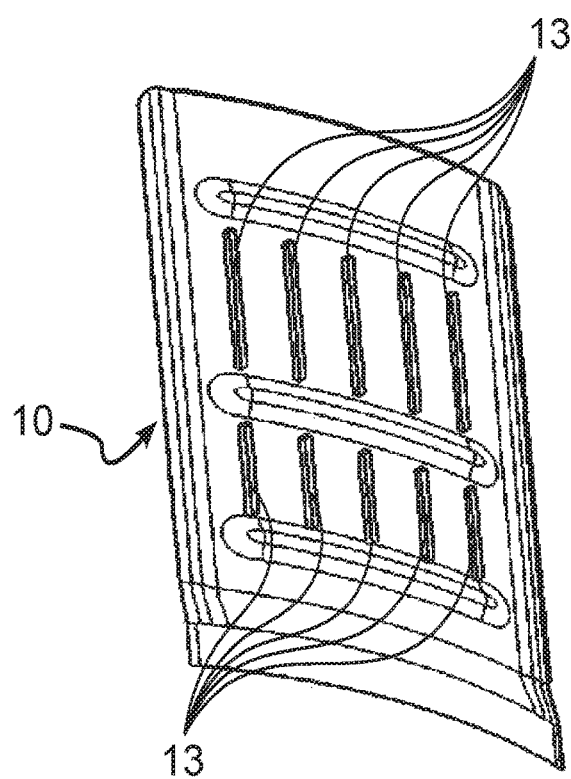
Fig. 2.c
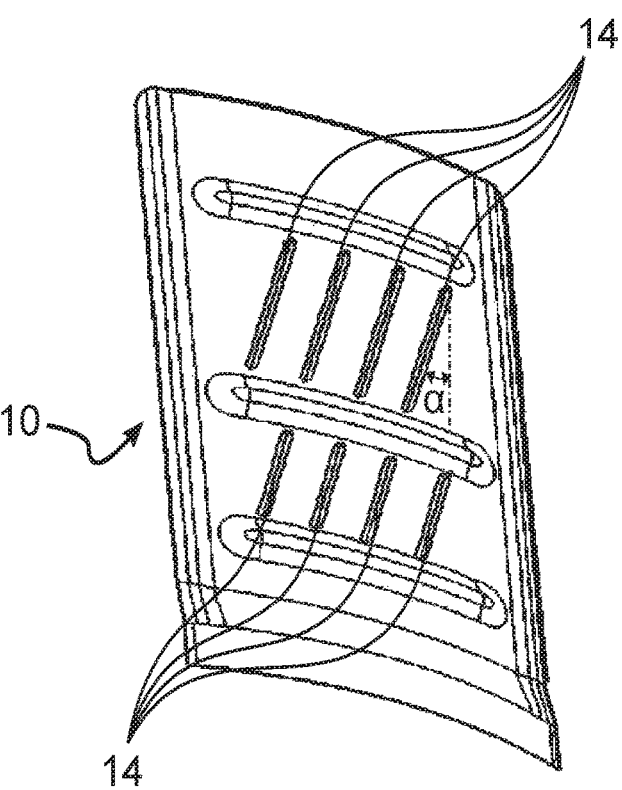
Fig. 2.d

HEAT SCREEN WITH OBSTACLES FOR A BRAKED AIRCRAFT WHEEL

The invention relates to a method of reducing the time required for cooling disks of an aircraft wheel brake, and to a heat screen for an aircraft wheel constituting an application thereof.

BACKGROUND OF THE INVENTION

Certain aircraft wheels are associated with a brake comprising a stack of disks that are housed at least in part inside the wheel. It is known to place a heat screen between the disks and the wheel so as to protect the wheel and the tire from radiation from hot disks. In particular, it is important to avoid zones of the wheel that are in contact with the tire reaching a temperature higher than 200 degrees Celsius.

Nevertheless, such screens impede dumping of the heat that is accumulated in the brake during landing and during taxiing of the aircraft from the runway to the terminal. Unfortunately, the temperature of the brake is a major criterion for the operability of the aircraft. For example, takeoffs are authorized only if the temperature of the brake is less than 400 degrees. Unfortunately, the brake takes a certain amount of time to cool, which can prevent the aircraft from taking off again quickly after calling at the terminal.

Various means have been proposed to reduce this cooling time, in particular by using a cooling fan. Nevertheless, such equipment is not selected by all airlines.

OBJECT OF THE INVENTION

The invention seeks to provide a method that makes it possible to reduce the time required for cooling the disks of an aircraft wheel brake, thus serving to improve operating conditions for the aircraft.

SUMMARY OF THE INVENTION

In order to achieve this object, the invention provides a method of reducing the cooling time of disks of a brake of an aircraft wheel fitted with a heat screen extending between the wheel and the disks of the brake and mounted to rotate on an aircraft undercarriage about an axis of rotation, the method including making obstacles on the heat screen, which obstacles project from a face of the heat screen that faces towards the brake disks.

While the wheel is rotating, the obstacles generate and maintain stirring of the air that surrounds the disks, thereby improving cooling of the disks. When the wheel is not rotating, the obstacles act like fins on a radiator so as to increase the area of heat exchange by conduction, and they thus contribute to cooling the disks. Furthermore, a suitable orientation for the obstacles makes it possible to generate an axial convective movement that expels air to the outside of the wheel, thereby contributing to dumping a portion of the heat to the outside. Finally, the radiation emitted by the disks may be deflected in part by obstacles in a direction that is axial, thereby contributing to dumping a portion of the heat to the outside.

The presence of obstacles on the heat screen makes it possible to reduce the time required for the disks to cool by several percent, thereby increasing the availability of the aircraft.

The term "obstacles" is used to mean repeated shapes that are deliberately created on the surface of the heat screen so as to enhance cooling of the brake. Naturally, this excludes shape irregularities, such as the step at an edge of one petal of the heat screen where it overlies the edge of an adjacent petal.

BRIEF DESCRIPTION OF THE DRAWINGS

The invention can be better understood in the light of the following description of non-limiting embodiments of the invention, given with reference to the figures of the accompanying drawings, in which:

FIGS. 2a to 2d are perspective views of petals of heat screens provided with obstacles in various embodiments of the invention.

DETAILED DESCRIPTION OF THE INVENTION

Figure 1:
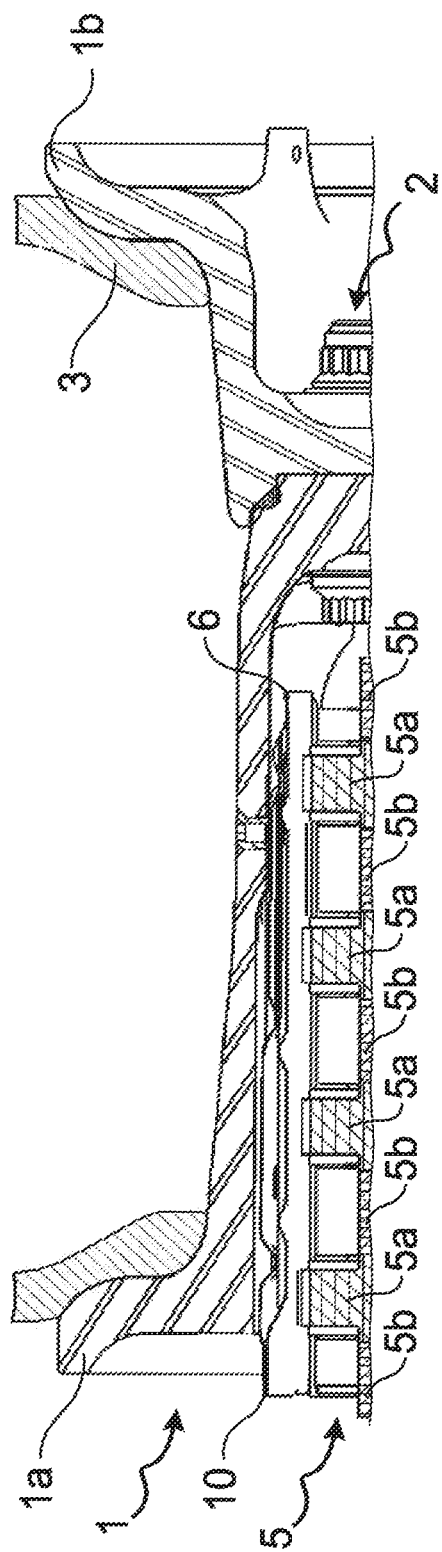
FIG. 1 is a fragmentary section view of an aircraft wheel fitted with a brake and provided with a heat screen.

With reference to FIG. 1, the invention applies to an aircraft wheel 1, specifically comprising two half-wheels 1a and 1b connected together by bolts 2 in order to carry a tire 3. The wheel is provided with bearings (not shown) for mounting it to rotate on an axle of an undercarriage of the aircraft about an axis of rotation that is substantially horizontal. The half-wheel 1a is hollow and receives disks of a brake 5, with its rotor disks 5a being driven in rotation about the axis of rotation of the wheel by bars 6 formed in the half-wheel 1a, and with its stator disks 5b being engaged on a torque takeup tube of the brake (not shown) that prevents them from rotating. A heat screen 10 constituted, in this example, by a plurality of petals, each extending between two bars 6, is arranged between the rim of the wheel 1 and the disks 5a and 5b in order to protect the wheel from radiation from hot disks. This is well known and is recalled merely to situate the invention.

In the invention, the heat screen 10 is fitted with obstacles that project from a face of the heat screen that faces towards the disks.

In a first embodiment of the invention, as shown in FIG. 2a, the heat screen 10 has obstacles in the form of airfoils 11 oriented so as to create axial movement of the air surrounding the brake disks (the axial direction being the direction parallel to the axis of rotation of the wheel) while the wheel is rotating, thereby stirring the air (forced convection). In this example, the airfoils are obtained by stamping the inner sheet of the heat screen so that it has cambered airfoil shapes, each with a rounded leading edge and a tapering trailing edge arranged at an angle of incidence relative to a radial direction. Nevertheless, any other airfoil might be suitable, such as merely a portion of metal foil arranged at an angle of incidence relative to a radial direction.

The airfoils 11 are preferably arranged in rows of a plurality of parallel obstacles, each row extending axially. From one row to the next, the airfoils 11 may be offset axially in order to further enhance the stirring of the air. They are oriented in such a manner as to induce an axial component in the forced convective flow. The space between two rows of obstacles constitutes an axial passage for natural convection when the wheel is not rotating.

In a second embodiment of the invention, as shown in FIG. 2b, the heat screen 10 is fitted with obstacles in the form of parallel scoops 12 obtained by stamping the inner sheet of each petal. In this example, the openings of the scoops 12 are oriented axially so as to stir the air surrounding the disks while the wheel is rotating, and so as to guide the air axially when the wheel is not rotating.

It should be observed that the scoops 12 extend symmetrically on either side of a plane of symmetry of the petal that passes via the axis of rotation of the wheel, such that the petals can be mounted equally well on wheels mounted on the right or on the left of an undercarriage.

In a third embodiment of the invention shown in FIG. 2c, the heat screen 10 is fitted with obstacles in the form of parallel strips 13 that are fitted onto the inner sheet of each petal, by using adhesive in this example. Likewise, the strips 13 are oriented axially so as to stir the air surrounding the disks while the wheel is rotating, and so as to guide the air axially while the wheel is not rotating.

It should be observed that the strips 13 extend symmetrically on either side of a plane of symmetry of the petal containing the axis of rotation of the wheel so that the petals can be mounted equally well on wheels mounted on the right or on the left of an undercarriage.

In a fourth embodiment of the invention, as shown in FIG. 2d, the heat screen 10 is fitted with obstacles in the form of parallel strips 14 that are fitted in this example by adhesive on the inner sheet of each petal, but that present a small angle α in this example relative to the axial direction, thereby serving to accentuate the axial convective flow.

In all of the embodiments, in addition to their effects on natural and forced convection, the obstacles, by their mere presence, contribute to increasing the conduction area of the heat screen, so that it absorbs more heat and contributes to faster cooling of the disks. In addition, the obstacles deflect a fraction of the radiation from the disks along a direction that is axial, thereby directing a portion of the radiant flux to the outside.

The invention is not limited to the above description, but on the contrary covers any variant coming within the ambit defined by the claims. In particular, the invention applies equally well to heat screens made of one sheet or of a plurality of sheets. In addition, the obstacles may be obtained by any known means, such as for example, stamping, welding, folding, machining, cutting, adhesive, . . . , providing they project from the face of the heat screen that faces towards the disks.

The invention claimed is:

1. A method of reducing the cooling time of disks of a brake (5) of an aircraft wheel (1) fitted with a heat screen (10) extending between the wheel and the disks of the brake and mounted to rotate on an aircraft undercarriage about an axis of rotation, the method including making obstacles (11; 12; 13; 14) on the heat screen, which obstacles project from a face of the heat screen that faces towards the brake disks and extend non-circumferentially to generate an axial convective movement that expels air to the outside of the wheel when said wheel is turning.

2. The method according to claim 1, wherein the obstacles comprise parallel strips.

3. The method according to claim 2, wherein the strips extend axially.

4. The method according to claim 2, wherein the strips extend at an angle (a) relative to an axial direction.

5. The method according to claim 1, wherein the obstacles are airfoils (11) installed in rows that extend axially.

6. The method according to claim 5, wherein the airfoils present an angle of incidence relative to a radial direction.

7. The method according to claim 1, wherein the obstacles are parallel scoops (12) having axially extending openings.

8. A heat screen (10) for reducing the cooling time of disks of a brake (5) of an aircraft wheel (1) comprising:
   at least one petal extending between the wheel and the disks of the brake and mounted to rotate on an aircraft undercarriage about an axis of rotation; and
   a plurality of obstacles (11; 12; 13; 14) on the heat screen, wherein the obstacles project from a face of the heat screen that faces towards the brake disks and extend non-circumferentially to generate an axial convective movement that expels air to the outside of the wheel when said wheel is turning.

9. The heat screen according to claim 8, including at least one petal having said obstacles.

10. The heat screen according to claim 8, wherein the obstacles comprise parallel strips.

11. The heat screen according to claim 10, wherein the strips extend axially.

12. The heat screen according to claim 10, wherein the strips extend at an angle (α) relative to an axial direction.

13. The heat screen according to claim 8, wherein the obstacles are airfoils (11) installed in rows that extend axially.

14. The heat screen according to claim 13, wherein the airfoils present an angle of incidence relative to a radial direction.

15. The heat screen according to claim 8, wherein the obstacles are parallel scoops (12) having axially extending openings.

* * * * *